United States Patent [19]

Machida et al.

[11] Patent Number: 4,697,909
[45] Date of Patent: Oct. 6, 1987

[54] POWER SOURCE DEVICE WITH RESERVE POWER SOURCE FOR CAMERA

[75] Inventors: Kiyosada Machida, Kanagawa; Yoshiyuki Nakano; Nobuo Matsukawa, both of Tokyo, all of Japan

[73] Assignee: Nippon Kogaku K.K., Japan

[21] Appl. No.: 840,470

[22] Filed: Mar. 13, 1986

Related U.S. Application Data

[63] Continuation of Ser. No. 568,417, Jan. 5, 1984, abandoned.

[30] Foreign Application Priority Data

Jan. 6, 1983 [JP] Japan .................................. 58-301[U]

[51] Int. Cl.[4] ............................................. B03B 7/26
[52] U.S. Cl. ................................................... 354/484
[58] Field of Search ................. 354/145.1, 173.1, 295, 354/484

[56] References Cited

U.S. PATENT DOCUMENTS

4,041,514  8/1977  Johnson .............................. 354/295
4,091,395  5/1978  Kozuki et al. .................... 354/173.1
4,200,374  4/1980  Shimizu et al. ...................... 354/484

Primary Examiner—Michael L. Gellner
Assistant Examiner—David M. Gray
Attorney, Agent, or Firm—Gerald J. Ferguson, Jr.; Michael P. Hoffman; Ronni S. Malamud

[57] ABSTRACT

A device for supplying an electric energy to an electric device of a camera includes, first power source means in which a first cell is loaded that has a given output capacity sufficient for the electric device to exert its function, second power source means in which a second cell is loaded that has a given output capacity sufficient for the electric device to exert its function, and switching means to be operatively changed between a first switching state where the electric device is connected to the first power source means and a second switching state where the electric device is connected to the second power source means. Furthermore, the device includes responsive means responsive to the loading operation of the first cell for causing the switching means to change to the first switching state.

15 Claims, 16 Drawing Figures

POWER SOURCE DEVICE WITH RESERVE POWER SOURCE FOR CAMERA

This application is a continuation of Ser. No. 568,417, filed Jan. 5, 1984, now abandoned.

BACKGROUND OF THE INVENTION

This invention relates to a power source device for a camera and, particularly, to a power source device for the camera including a main power source and a reserve power source.

In recent years, with the advance of electronic techniques, several types of the cameras have been developed such as motor-incorporated cameras, autostrobo cameras, and auto-focus cameras.

These cameras, however, need a large energy in comparison to the conventional well-known camera incorporated with auto-exposure mechanism and, thus, energy consumption of a dry cell is heavy. Further, these cameras do not function at all when the cell energy is consumed substantially, thus, the user of the camera is required always to carry spare or reserve cells with one. Accordingly, for the above, spare cells are generally carried by the user, putting the same in a travelling bag, camera bag, small case attached to a camera strap, and the like. However, handling of cells for cell exchange is inconvenient and troublesome, and this sometimes results in a fear of missing a chance of shuttering.

SUMMARY OF THE INVENTION

It is an object of this invention to dissolve the foregoing drawbacks in the prior art, and to provide a power source device for the camera of the type in that a reserve power source is united with a camera body and carried always with a main power source, and the changing operation of the reserve power source can be reduced in frequency.

The power source device according to this invention is provided with a main power circuit including a main power source and a sub power circuit including a reserve power source, and constructed so that a circuit switching is achieved manually or automatically in such a manner that the main power circuit is brought into operation in preference to the sub power circuit.

In the device of this invention, both of the main and reserve power sources may be received in the camera body or may be received in a power supply unit whose housing is to be coupled to the camera body, or one of the power sources may be incorporated in the camera body with the other received in the power supply unit.

In a preferred feature of the device according to this invention, a power source switching operation lever normally-closing the main power circuit is positioned or located so as to be covered by the cells of the main power source or the power unit including the main power source, and, after the main power source portion is detached from the device, the switching operation for closing of the sub power circuit is allowed.

In addition to the foregoing features, it is preferable to provide means for recovering automatically the power source switching operation lever to a position where the main power circuit is closed when the main power source portion is again attached to the device.

In another feature of the device according to this invention, there is provided means for changing the power source change switch normally-closing the main power circuit as to close the sub power circuit automatically in response to the operation of removing the main power source cells from the camera body or power unit, or the operation of removing the power unit including the main power source from the camera body.

In a still another feature of the device according to this invention, there is provided means for ejecting the main power source cells from the camera body or power unit in response to the switching operation of the change switch that changes a connection from the main power circuit to the sub power circuit.

Further, the device according to this invention may include notifying means for drawing a user's attention to a request of recovering the main power circuit while the sub power circuit is closed, in order to prevent a power consumption of the reserve power source to the best.

DESCRIPTION OF THE PREFERRED EMBODIMENTS

Figure 1:
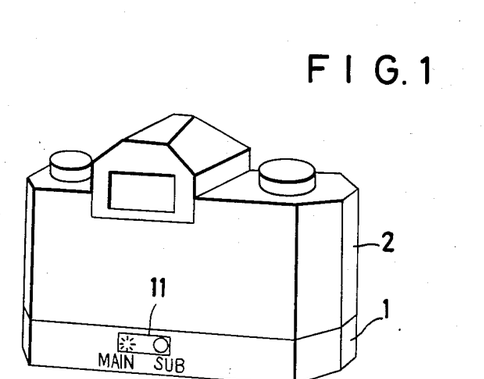
FIG. 1 is an external view of the camera according to a first embodiment of this invention.
Figure 2:
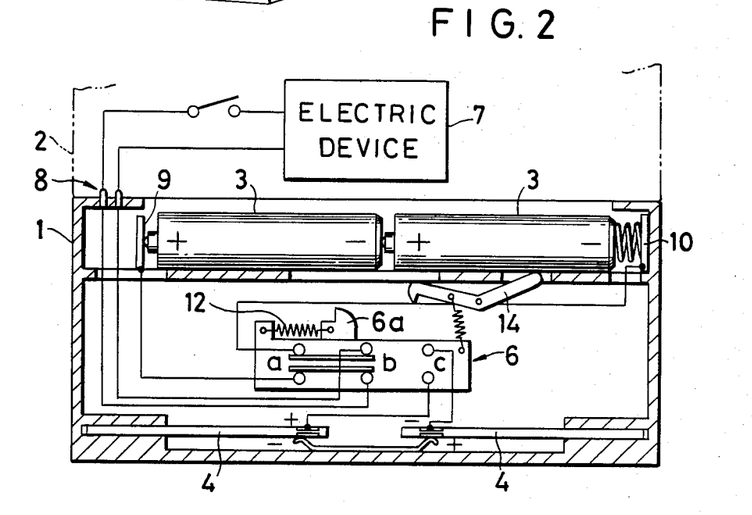
FIG. 2 is a summarized sectional view corresponding to FIG. 1.
Figure 3:
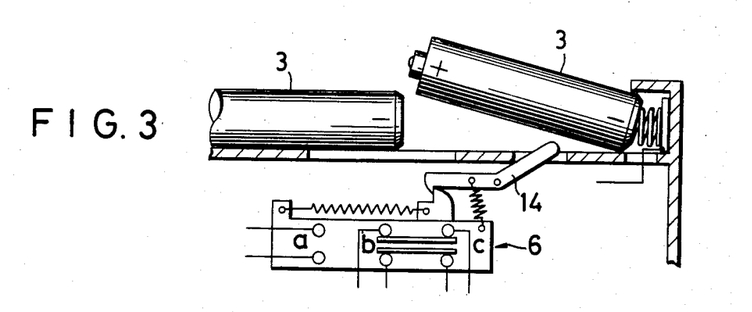
FIG. 3 is a drawing for explanation of the operation of the arrangement shown in FIG. 2.

FIGS. 1 to 3 show the device according to the first embodiment of this invention. A power unit 1 is detachably attached to a bottom of a camera body 2 by fixing screws (not shown). In the power unit 1, four series-connected main dry cells 3 of the cylinder type serving as the main power source and easily obtainable in the markets are stored, together with two paper batteries 4 such as sheet type lithium cells which have a long life time and exhibit very little self consumption of electric power under storage, serving as the reserve power source. The paper batteries 4 are stored in a bottom portion of a housing of the unit 1, the main dry cells 3 is stored in the vicinity of an opening formed in an upper portion of the unit 1 contacting with the camera body 2, and both the main dry cells 3 and the paper batteries 4 are loaded in the unit through the opening. In the space between main dry cells 3 and paper batteries 4 there is provided a change switch 6 for switching of the power source. Thus, this change switch 6 can be operated by fingers only when the main dry cells 3 are not loaded in the power unit 1.

Positive electrode and negative electrode of the main dry cells 3 are connected to a terminal a (on the left side) of the change switch 6 through conductor plates 9 and 10, respectively, and an electric device 7 of the camera body 2 is connected to a neutral terminals b (center) of the change switch 6 through a connector 8. When a change knob 6a is pulled by a spring 12 and positioned on the left side as shown in FIG. 2, terminals a and neutral terminals b are in the conducting state. That is, the main power circuit is in the closed state and the electric power is supplied from the main dry cells 3 to the electric device 7. The conducting state of the main power circuit is indicated in an indication window 11 provided in the power unit 1.

If the voltage of the main dry cells 3 lowers and is insufficient for use, the power unit 1 is removed from the camera body and the main dry cells 3 are taken out to expose the change switch 6. In response to removal of the cells 3, a lever 14 pushed down by the cells 3 up to this moment is pivoted in the counterclockwise direction by a spring. By moving the change knob 6a rightward, the electric contact between the terminals a and the neutral terminals b is broken, the terminals c come into contact with the neutral terminals b, the power supply to the electric device 7 of the camera body 2 is changed from the dry cells 3 to the paper batteries 4, and the change knob 6a is held by a claw 14a of the lever 14. Then, by attaching the power unit 1 to camera body 2, the normal function of the camera recovers. Further, in this position, the conducting state of the sub power circuit is indicated in the indication window 11.

Then, if new main dry cells 3 are loaded, the lever 14 is pivoted in the clockwise direction as shown in FIG. 3 and the change knob 6a is released. Thus, the knob 6a recovers automatically to the initial position the main power circuit is automatically conducted, and the main dry cells are used preferentially.

Figure 4:
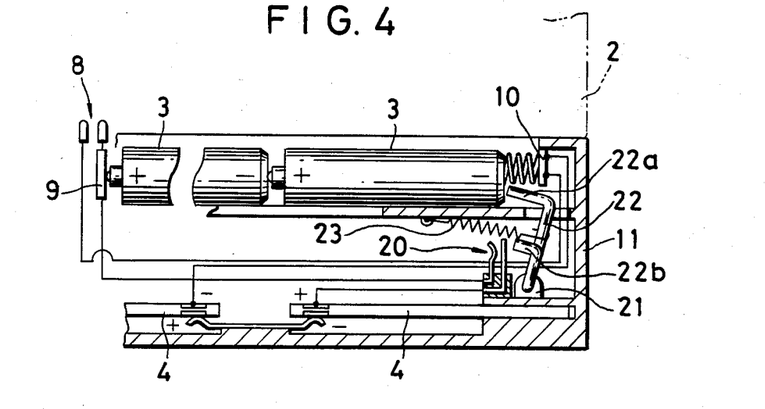
FIG. 4 is a sectional view showing the devide according to a second embodiment of this invention.

The second embodiment shown in FIG. 4 is the one more automated than the first embodiment in the point that the switching operation to use the sub power circuit responds to the removal operation of the main dry cells.

That is, a crank shaft 22 pivotably supported by a bracket 21 of the power unit 11 is made by an insulation material, and its free end 22a is urged against an end face of the main dry cell 3 under the pulling section of a spring 23. When rotated in the counterclockwise direction, an arm portion 22b of the crank shaft 22 closes a switch 20. One terminal of the switch 20 is connected to the positive electrode of the paper battery 4 and the other terminal is connected through a conductor plate 9 and a connector 8 to the electric device of the camera body 2. The negative electrode of the paper battery 4 is connected through a conductor plate 10 and the connector 8 to the electric device of the camera body 2.

When the main dry cells 3 is removed, the crank shaft 22 pivotes in the counterclockwise direction to the close switch 20. Thus, as soon as the main power circuit is opened upon removal of the main dry cells 3, the sub power circuit is automatically closed.

Thereafter, by detaching the power unit 11 from the camera body 2 and loading new main dry cells 3, the crank shaft 22 pivotes in the clockwise direction to the position shown in FIG. 4, whereby the switch 20 is opened and the sub power circuit becomes the open circuit state.

Figure 5A:
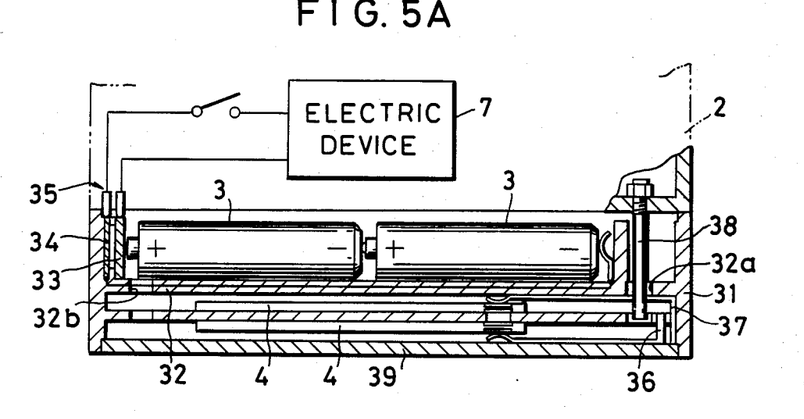
FIGS. 5A and 5B are sectional views showing the device according to a third embodiment of this invention.
Figure 5B:
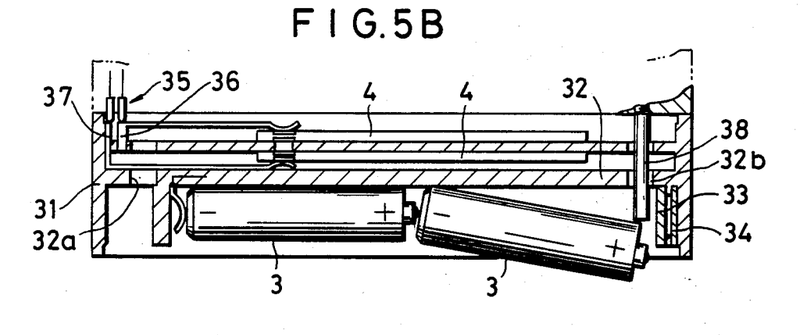

FIGS. 5A and 5B show the third embodiment of this invention. A power unit 31 is divided by a partition 32 into two, upper and lower, chambers; one chamber being a main power chamber for receiving the main dry cells 3 and the other being a reserve power chamber for receiving the paper batteries 4. Conductor plates 33 and 34 connected to positive and negative electrodes, respectively, of the dry cells 3 are connected through connector terminals 35 of the camera body to electric device 7 when power unit 31 is attached to the camera body 2. Positive and negative electrodes of paper batteries 4 are connected to conductor plates 36 and 37, respectively. The conductor plates 36 and 37 are so positioned that they make contact with connector terminals 35 on the side of camera body 2 when the power unit is turned upside down and then attached to the camera body 2.

The partition 32 in the power unit has formed with two pierced holes 32a and 32b at different spots. The hole 32a is so located that it opposes neither the cells 3 nor the paper batteries 4, while the hole 32b opposes the cell 3. A rod 38 is fixed to the bottom of the camera body 2, extending into the power unit 31 and passing through pierced hole 32a.

When the main dry cells 3 are energy-consumed and it is required to substitute the reserve power source for the former, the power unit 31 is removed from the camera body 2. Then, after a bottom lid is removed, the housing of the unit is turned upside down as shown in FIG. 5B and attached to the camera body 2 so as to bring contact between the conductor plates 36, 37 and the connector terminals 35 of the camera body, in turn, the main dry cells 3 are pushed outward by the rod 38. Accordingly, the user or operator is called to replace the main dry cells.

Figure 6:
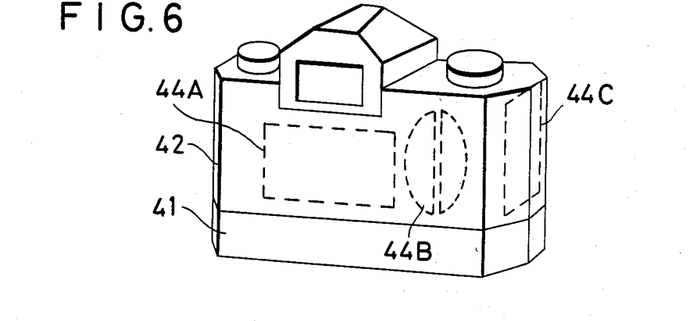
FIG. 6 is an external view of the camera according to a fourth embodiment of this invention.
Figure 7:
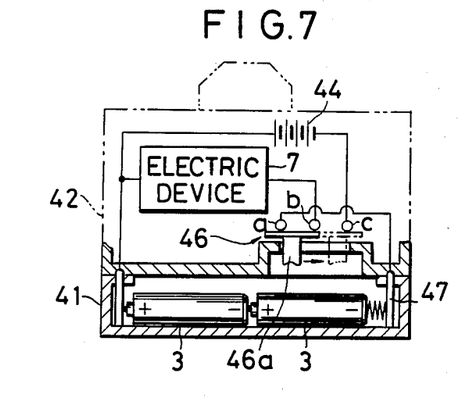
FIG. 7 is a schematic diagram showing an internal arrangement of the embodiment shown in FIG. 6.
Figure 8:
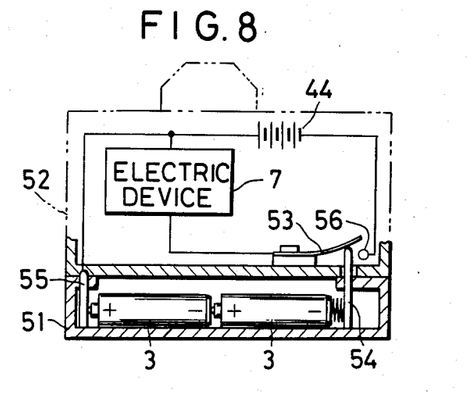
FIG. 8 is a schematic diagram showing a modification of the embodiment shown in FIG. 7.

In the embodiments shown in FIGS. 6 to 8, paper batteries as reserve power sources are stored inside the camera body and the dry cells of the main power source are loaded in the power unit attached to the bottom of the camera body.

Inside the rear lid of the camera, as shown in FIG. 6, there are provided a rectangular paper battery 44A and two semi-circular paper batteries 44B, with another rectangular paper battery 44C attached to the side face of the camera body. Though this embodiment has three batteries 44A, 44B and 44C differing in size and shape, one type of paper batteries are sufficient as the reserve power source if they are stored in the power chamber of the camera body. Negative electrode of the paper battery functioning as the reserve power source is connected to a terminal c of a change switch 46 as shown in FIG. 7. An operation knob 46a of this change switch is projecting into a recess formed in the bottom face of the camera body 42. Within the power unit 41, four main dry cells 3 are loaded and series-connected together, and the negative electrode of the main dry cells 3 is connected through a connector terminal 47 of the power unit to terminal a of the change switch 46. Thus, in the state of FIG. 7 where the terminals a and b are connected in the switch 46, an electric device 7 is powered from the main dry cells 3.

In case of using the reserve power source, the power unit 41 is removed from the camera body 42. As a result, the change knob 46a appears in the recess. By moving the change knob 46a rightward to make contact between the terminals b and c, the electric device 7 is powered from the paper batteries 44. According to the construction as described above, before the switching operation from the main power circuit to the sub power circuit, the operation of detaching the main power source from the camera body is inevitably accompanied. Thus, unnecessary manipulation of the change switch is avoided and exchange of the main dry cells is promoted.

The embodiment of FIG. 8 is improved over the arrangement shown in FIG. 7 in that the change switch is automatically operated. The negative electrode of the main dry cell 3 within the power unit 51 is connected to the electric device 7 through a movable contact segment 53 mounted on the camera body 52 and a contact pin 54 provided in the power unit so as to push the movable contact segment 53 upward. Further, the positive electrode of the main dry cell 3 is connected through a connector terminal 55 to the electric device 7. Thus, in the state shown in FIG. 8, the electric device 7 is powered from the main dry cells 3.

As the power unit 51 is detached from the camera body 52, the contact pin 54 parts from the movable contact segment 53 thereby opening the main power circuit. At the same time, the movable contact segment 53 deforms due to its force of restoration and comes into contact with a fixed contact 56 connected to the negative electrode of the paper batteries 44. Thus, as the main power circuit is cut off, the sub power circuit is automatically closed and the power supply from the paper batteries is allowed. Then, if the power unit 51 with new dry cells loaded therein is attached again to the camera body 62, the power supply from the paper batteries of the reserve power source is automatically terminated and, in place of the former, power supply from the main dry cells 3 of the main power source is allowed.

FIGS. 9 to 12 show the embodiment in that both the main power source and the reserve power source are stored in the camera body.

Figure 10:
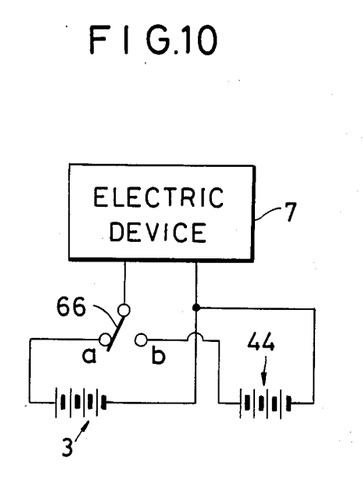
FIG. 10 is an electric wiring diagram of the device shown in FIG. 9.

Main dry cells 3 are stored in the battery box formed in the bottom of the camera body 61, whereas paper batteries 44 are arranged in the same manner as the embodiment shown in FIG. 6. An electric device 7 within the camera is electrically connected to both power sources as is shown in FIG. 10 and powered from either one of two power sources 3 and 44 in response to selection operation of a change switch 66.

Figure 9:
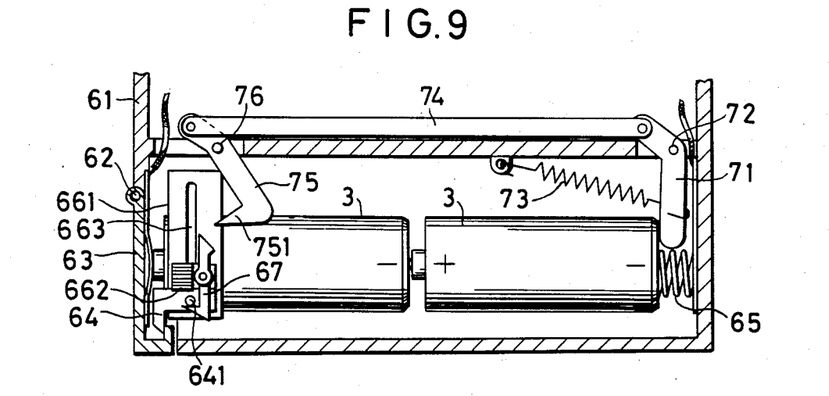
FIG. 9 is a sectional view of the device according to a fifth embodiment of this invention in the state where the main power circuit is under operation.

A lid 63 for the cell is coupled to a hinge 62 of the battery box so that it opens and shuts freely about the hinge. The lid 63 is held by a lock lever 64 and closes the box while urging the cells 3 towards a conductor spring 65.

Figure 11:
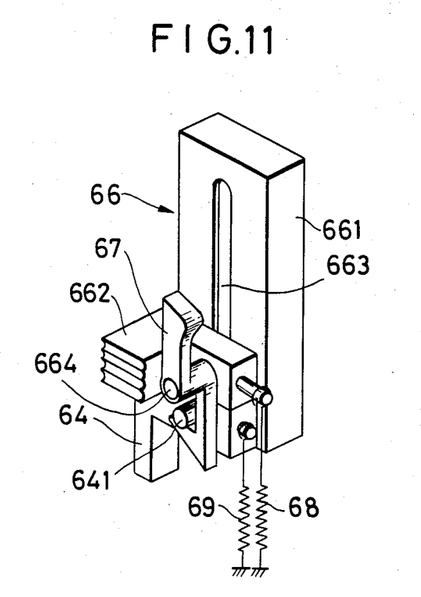
FIG. 11 is a perspective view showing a change switch and a lock lever.

The change switch 66 is provided in a switch box 661. When a change knob 662, which is exposed outside the camera body and can be touched by a finger of the operator, is slided upward along a slot 663 of the switch box 661, the switch is changed from contact a to contact b in interlocked relation to the former. To a pin 664 on the knob 662 a coupling 67 is pivoted as shown in FIG. 11, this coupling 67 engages with a pin 641 on the lock lever 64 to interlock the lever 64 and the knob 662. The knob 662 and the lever 64 are pulled downward by springs 68 and 69, respectively.

In a back portion of the battery box, a lever 71 is pivotably supported by a supporting shaft 72 and urged by a spring 73 in the clockwise direction about supporting shaft 72. One end of lever 71 is abutting against the negative electrode end face of the main dry cell 3, and the other end is interlocked through a coupling rod 74 to a claw lever 75 pivotably supported by a shaft 76. The lever 71, the coupling rod 74 and the claw lever 75 form a quadric crank link, thus, in response to rotation in the clockwise direction of the lever 71, a latch claw 751 formed at one end of the claw lever 75 is displaced leftward.

In the state shown in FIG. 9 where dry cells 3 are loaded in the battery box and the lid 63 is shut, the lever 71 whose one end is pushed by dry cells 3 in resisting the urging force of the spring 73 causes via coupling rod 74 latch the claw 751 of the claw lever 75 to retract from the path of the change knob 662. In the case that the main dry cells 3 of the main power source are consumed and the main power circuit needs to be replaced by the sub power circuit, the change knob 662 is operated. In response to upward sliding of the change knob 662, the lock lever 64 is moved upward by means of the coupling 67 and the lid 63 is unlocked. The dry cells 3 push the lid 63 and come out of the housing by means of the urging force of the conductor spring 65. Thus, the dry cells 3 can be taken out from the battery box.

Figure 12:
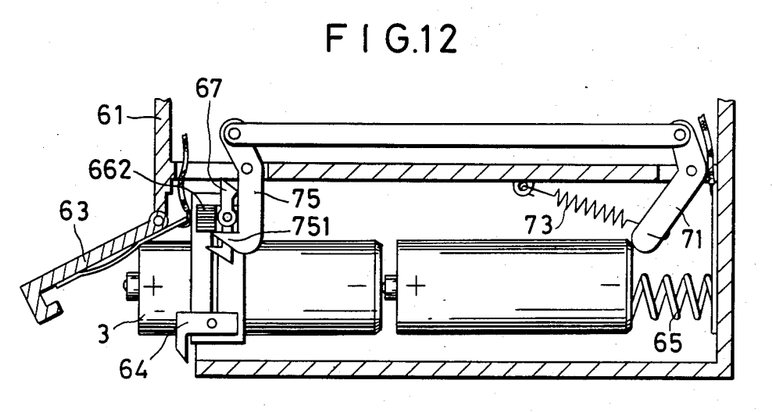
FIG. 12 is a sectional view showing the state where the sub power circuit is under operation as the result of operation of the change switch.

When the dry cells 3 are pushed and moved, in response to this movement levers 71 and 75 pivot in the clockwise direction and the latch claw 751 of the claw lever 75 projects into the path of the knob 662.

As the change knob 662 moves upward together with the lock lever 64, at first, the main power circuit is switched to the sub power circuit. Then, the coupling 67 touches the latch claw 751 thereby to be pivoted in the counterclockwise direction, so that the holding of the lock lever 64 by the pin 641 is released and the lock lever 64 returns to the initial lower position owing to the urging force of the spring 69. As the change knob 662 moves upward further, the latch claw 751 is pushed back rightward once and, when the knob 662 reaches the uppermost position, the latch claw 751 moves again leftward and comes under the change knob 662. Accordingly, the change knob 662 is locked in the position where the sub power circuit is closed, and the reserve power source is available for power supply.

As new dry cells 3 are inserted into the battery box and the lid 63 is shut, the dry cells are pushed by the lid, move while compressing the conductor spring 65, and pivot the lever 71 simultaneously. In response to this pivot, the claw lever 75 pivotes in the counterclockwise direction and the latch claw 751 releases latching of the change knob 662. Accordingly, the change knob 662 returns automatically to the lower position by means of the urging force of the tension spring 68, and the main power circuit is closed.

According to the foregoing embodiment, if the main power circuit is manually changed to the sub power circuit, the main dry cells are automatically exposed, whereby allowing taking out of the same. Further, if new main dry cells are loaded again, the sub power circuit is automatically changed to the main power circuit.

Figure 13:
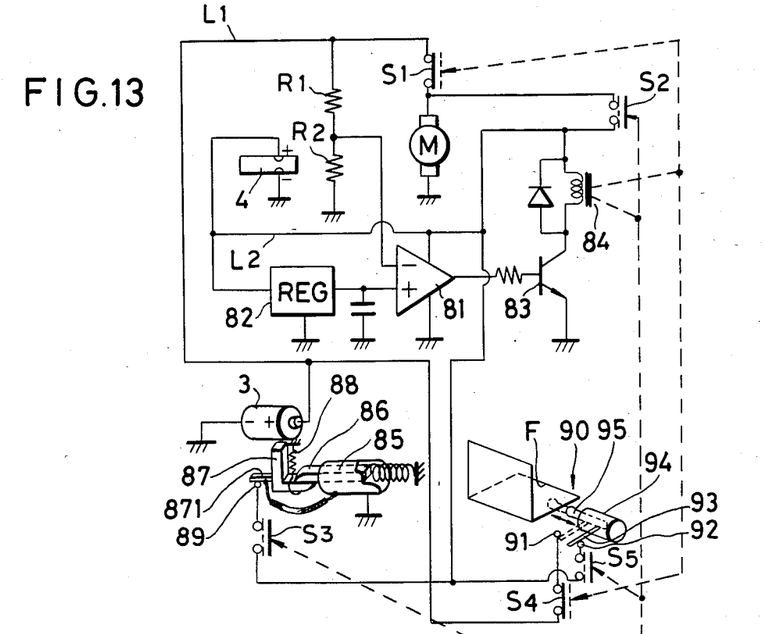
FIG. 13 is a schematic diagram showing the circuit arrangement of the device according to a sixth embodiment of this invention.

Though the foregoing embodiment utilizes the mechanical changing means in order to use the main power source in preference to the reserve power source, this can be realized by electrical changing means. FIG. 13 shows the embodiment realizing the electric changing, which comprises an electric circuit for changing automatically from the main power circuit to the sub power circuit when the electric potential of the main power circuit lowers to a level insufficient for use, a unit for ejecting the main dry cells out of the battery box in response to the foregoing changing, and an indicator for indicating that changing in a finder of the camera.

A motor M for winding up a film or actuating a shutter is powered and driven by main dry cells 3 of the main power source through a relay switch S1. Power supply from paper batteries 4 of the reserve power source to the motor M is commenced when a relay switch S2 is turned on. The voltage of a main power line L1 is applied through a divider resistor R1-R2 to an inverted input terminal of a comparator 81, the voltage of a sub power line L2 is applied through a regulator 82 to a non-inverted input terminal of the comparator S1, and in this comparator 81 the voltage difference between the main power line L1 and the regulator output is compared and obtained. As the voltage of the main power line L1 lowers and if the voltage at the inverted input terminal of the comparator 81 becomes lower than the voltage at the non-inverted input terminal, a transistor 83 turns on and a relay 84 is energized. As the relay 84 actuates, the relay switch S1 turns off, thus, the main power line L1 is opened and the power supply from main dry cells 3 is terminated. However, at the same time, the relay switch S2 turns on, thus, the sub power line L2 is closed and the power supply from the paper battery 4 is initiated accordingly, the motor M is driven normally without interruption.

As a mechanism, a magnet 85 of the solenoid type is provided in the vicinity of a chamber for receiving main dry cells 3 of the main power source, and the tip of an armature 86 slidingly received in the solenoid is preventing an upward movement of an L-shaped pushing member 87 which is pulled by a spring 88. As the latching action by the armature is released, the member 87 moves upward to push out the cells 3 from the chamber. The member 87 has a movable electric contact segment 871, and a fixed contact 89 contacting with the movable segment 871 is connected through a relay switch S3 to the sub power line L2. Further, the armature 86 is urged leftward by a compression spring, moves rightward as the magnet 85 is energized while resisting the urging force of the compression spring, and releases the locking of the member 87.

When the relay switch S2 turns on by actuation of the relay 84, the relay switch S3 also turns on, so that the magnet 85 is powered from the paper battery 4, the armature 86 moves, and the member 87 pushes the cells 3. Upon movement of the member 87, the contact between the movable segment 871 and the fixed contact 89 is broken, the power supply to the magnet 85 is terminated, and the armature returns to the initial position by the urging force of the compression spring. Then, if new cells 3 are loaded in the battery box, member 87 is pushed by the loaded dry cells 3 to move downward and latched by the armature 87. Due to this new dry cells just loaded, the voltage of the main power line L1 risen up to the normal voltage, thus, the comparator 81 turns the transistor 83 off thereby the relay 84 becoming deenergized. Accordingly, the relay switch S3 breakes and no power is applied to the magnet 85. At the same time, the relay switch S1 turns on and the relay switch S2 turns off, thus, the power circuits are automatically switched therebetween and the motor M is driven by the power from the main dry cells 3. On the other hand, the switching between the main power line L1 and the sub power line L2 is indicated in a visual field of the finder by means of an indicator 90. That is, when the relay switch S4 is ON with the relay switch S1 being ON, whereas when the relay switches S2 and S3 are ON, the relay switch S5 too is ON. The fixed contacts 91 and 92 are connected through the relay switches S4 and S5 to the power lines L1 and L2, respectively. A movable contact segment 93 contactable and conductable with the fixed contacts 91 and 92 is movable in the arrow directions in interlocked relation to an indication rod 95 which is slidable within a magnet 94. The indication rod 95 is normally positioned outside the visual field of the finder F, but, when the magnet 94 is powered through the relay switch S5 and the contact 92, the indication rod moves leftward and its tip portion projects into the visual field of the finder F as shown in the broken line, thereby indicating that the sub power circuit is under use.

Figure 14:
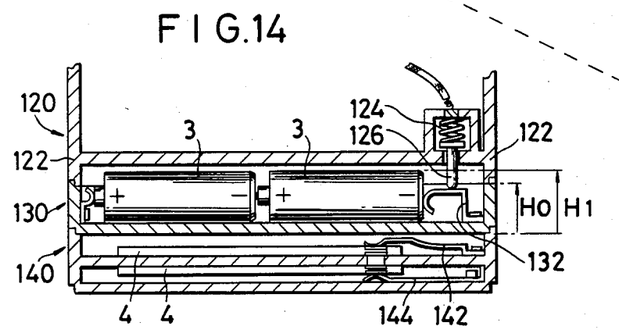
FIG. 14 is a sectional view of the device according to a seventh embodiment of this invention.
Figure 15:
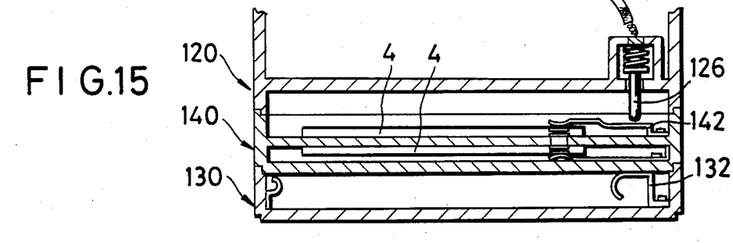
FIG. 15 is a sectional view of the device shown in FIG. 14 showing the state where the reserve power source is in use.

In the embodiments shown in FIGS. 14 and 15, the main power source dry cells and the reserve power source paper batteries are stored in respective housings, and two housings are coupled together to form a single body and attached to the camera body.

The housing's bottom of the camera body 120 is extending downward at its periphery so as to form a surrounding wall 122 to give a box shape. A main power unit 130 is detachably attached to that surrounding wall by some fastening means (not shown), and a sub power unit 140 is also detachably attached to the lower portion of the main power unit 130 by some fastening means (not shown). Here, it should be noted that these power units are constructed in such a manner that the sub power unit 140 can be positioned on the main power unit 130 and directly attached to the camera body, as shown in FIG. 15.

The bottom of the camera body has a conductor spring 124 whose one end is connected to the electric device (not shown), the other end pushing downward a conductor rod 126 which projects from the bottom. The tip of this conductor rod is contacting with a contact 132 which is fixed inside the main power unit 130 and connectable with the negative electrode of the dry cell 3, as shown in FIG. 14.

A similar combination as that of the foregoin elements 124, 126 and 132 is also provided for the positive electrode of the dry cell 3, thus, in the arrangement shown in FIG. 14, the electric device of the camera is powered from the dry cells 3.

The housing of the main power unit 130 is surrounded by a wall at its periphery whose height is Ho, and this height is designed to be smaller than a diameter $H_1$ of dry cells 3. Accordingly, if the main power, unit is attached directly to the camera body, the upper portion of the dry cell 3 positions inside the surrounding wall 122 of the camera body.

On the other hand, in the sub power unit 140 there are provided contact segments 142 and 144 to be contacted with negative and positive electrodes, respectively, of the two paper batteries 4 which are loaded so as to be connected mutually seriesly.

In case of changing from the main power source to the reserve power source, the main power unit 130 is at first detached from the camera body 120, the sub power unit 140 is then removed from the unit 130, and, at last, this unit 140 is directly attached to the lower portion of the camera body 120 as shown in FIG. 15. At this time, the conductor rod 126 contacts with the contact 142 of the sub power unit 140, thus, the electric device of the camera is powered by the paper batteries 4 of the sub power unit 140.

When the sub power unit is used to power-supply, the main power unit 130 can be attached to the lower portion of the sub power unit housing and can be carried together with the camera body only when the used dry cells are removed from unit 130.

What is claimed is:

1. A device for supplying an electric energy to an electric device of a camera body comprising:
   a housing,
   means for receiving within said housing a first cell which has a given output voltage sufficient for said electric device to exert its function;
   means for receiving within said housing a second cell which has a given output voltage sufficient for said electric device to exert its function;
   first and second electric contact means disposed individually at different positions on said housing and to be connected to said first and second cells, respectively; and
   means, having a first coupling position where said first contact means is electrically connected to said electric device and a second coupling position where said second contact means is electrically connected to said electric device, for coupling said housing to said camera body.

2. A device for supplying an electric energy to an electric device of a camera body as claimed in claim 1 including further means for acting on said first cell to eject the same from said housing when said housing is coupled at said second coupling position to said camera body.

3. A device for supplying an electric energy to an electric device of a camera body as claimed in claim 2 characterized in that said housing is formed with a chamber for receiving said first cell, and said ejecting means includes a member to project into said chamber in response to coupling of said housing with said camera body at said second coupling position.

4. A device for supplying an electric energy to an electric device of a camera body as claimed in claim 1 characterized in that said housing has a first housing for receiving said first cell and a second housing for receiving said second cell,
   said first and second electric contact means are disposed on said first and second housings, respectively,
   at said first coupling position said first housing is coupled to said camera body with said second housing being coupled to said first housing, and
   at said second coupling position said second housing is coupled to said camera body with said first housing being coupled to said second housing.

5. A device for supplying an electric energy to an electric device of a camera body as claimed in claim 4 characterized in that said first housing has a chamber for receiving said first cell, and said second housing includes means for entering into said chamber of said first housing being coupled at said second coupling position to prevent receiving of said first cell.

6. A device coupled detachably to a camera body for supplying an electric energy to an electric device of a camera comprising:
   a housing to be coupled to said camera body, said housing being formed with an opening to be covered by said camera body while said housing is coupled to said camera body and a chamber for receiving a first cell passing through said opening which has a given output voltage sufficient for said electric device to exert its function;
   means for receiving a second cell having a given output voltage sufficient for said electric device to exert its function;
   a connector for electrically connecting said camera body and said housing, said connector being connected to said first cell received in said chamber; and
   change means operated by an operator to connect said second cell to said connector, said change means being positioned to be exposed in said opening of said housing when said first cell is not in said chamber and to be covered by said first cell being received in said chamber.

7. A device for supplying an electric energy to an electric device of a camera body comprising:
   a power unit provided with a housing to be coupled to said camera body, means for receiving within said housing a first cell having a given output voltage sufficient for said electric device to exert its function and an electric contact to be connected to said first cell;
   means provided in said camera body for receiving a second cell having a given output voltage sufficient for said electric device to exert its function;
   means to be connected to said electric contact of said power unit when said housing is coupled to said camera body for connecting electrically said electric contact and said electric device;
   operation means disposed at a position where it is covered by said housing of said power unit being on said camera body and to be exposed and touchable by an operator as said housing is removed from said camera body; and
   means responsive to said operation means for connecting electrically said second cell to said electric device.

8. A device for supplying an electric energy to an electric device of a camera comprising:
   first power source means in which a first cell is loaded that has a given output voltage sufficient for said electric device to exert its function;
   second power source means in which a second cell is loaded that has a given output voltage sufficient for said electric device to exert its function;
   switching means to operatively changed between a first switching state where said electric device is connected to said first power source means and a second switch state where said electric device is connected to said second power source means;
   responsive means responsive to the loading operation of said first cell for causing said switching means to change to said first switching state;
   a frame member forming a chamber for receiving said first cell;
   a change member being operated to change said switching means from said first switching state to said second switching state; and
   means for ejecting said first cell from said chamber in respose to said change member.

9. A device for supplying an electric energy to an electric device of a camera as claimed in claim 8, said ejecting means comprising: means for biasing said first cell in a direction for ejecting said first cell from said chamber, means for holding said first cell in said chamber by resisting said biasing means and means for releasing said first cell from said holding means in response to said changer member.

10. A device for supplying an electric energy to an electric device of a camera as claimed in claim 9, wherein said frame member has an opening through which said first cell is received in said chamber and said holding means has a lid member to close said opening.

11. A device for supplying an electric energy to an electric device of a camera comprising:

first power source means in which a first cell is loaded that has a given output voltage sufficient for said electric device to exert its function, including a fame forming a chamber for receiving said first cell;

second power source means in which a second cell is loaded that has a given output voltage sufficient for said electric device to exert its function;

switching circuit means being operatively changed between a first switching state where said electric device is connected to said first power source means and a second switching state where said electric device is connected to said second power source means;

means for operating said switching circuit means to change from said first switching state to said second switching state; and means for ejecting said first cell from said chamber in response to said operating member, including actuating means coupled to said first cell received in said chamber for functioning to apply a mechanical displacement to said first cell.

12. A device for supplying an electric energy to an electric device of a camera as claimed in claim 11, wherein said operating means includes means for detecting the output voltage of said first cell becoming lower than a reference value, said ejecting means operable in response to said detecting means.

13. A device coupled detachably to a camera body for supplying an electric energy to an electric device of a camera as claimed in claim 6, wherein said change means comprises a switching means for switching said change means between a first switching state to connect said first cell to said connector and a second switching state to connect said second cell to said connector.

14. A device coupled detachably to a camera body for supplying an electric energy to an electric device of a camera as claimed in claim 13, further comprising a responsive means for switching said switching means to said first switching state operated by said first cell when said first cell is received in said chamber.

15. A device coupled detachably to a camera body for supplying an electric energy to an electric device of a camera as claimed in claim 14, wherein said responsive means comprises a displacing member having a portion which is projected within said chamber and displaced by the contact of said first cell and a biasing mean for biasing said displacing member in a direction of the projection of said portion within said chamber.

* * * * *